United States Patent [19]
Lo et al.

[11] 4,011,117
[45] Mar. 8, 1977

[54] METHOD FOR CURING POLY(GLYCIDYL 2,2-DINITRO-2-ETHOXIDE)

[75] Inventors: George A. Lo, Canoga Park; Milton B. Frankel, Tarzana, both of Calif.

[73] Assignee: The United States of America as represented by the Secretary of the Air Force, Washington, D.C.

[22] Filed: May 23, 1974

[21] Appl. No.: 472,795

[52] U.S. Cl. .................. 149/88; 149/19.3; 149/42
[51] Int. Cl.² ........................ C06B 25/00
[58] Field of Search ............ 149/88, 19.3, 42; 260/2 A

[56] References Cited

UNITED STATES PATENTS

| | | | |
|---|---|---|---|
| 3,636,060 | 1/1972 | Frankel et al. | 260/348.6 |
| 3,745,076 | 7/1973 | Sickman et al. | 149/88 X |

*Primary Examiner*—Leland A. Sebastian
*Attorney, Agent, or Firm*—Joseph E. Rusz; William J. O'Brien

[57] ABSTRACT

A method for effecting the cure of poly(glycidyl 2,2-dinitro-2-fluoroethoxide) by utilizing tris (B-isocyanoethyl) nitromethane as a curing agent.

1 Claim, No Drawings

METHOD FOR CURING POLY(GLYCIDYL 2,2-DINITRO-2-ETHOXIDE)

BACKGROUND OF THE INVENTION

This invention relates to a method for curing hydroxy-terminated prepolymers and to a curing agent for use therewith. More particularly, this invention concerns itself with a method for curing poly(glycidyl 2,2-dinitro-2-fluoroethoxide) by utilizing tris ($\beta$-isocyanoethyl) nitromethane as the curing agent.

With the increased employment of propellants and propellant systems, a considerable research effort has been conducted in an attempt to develop new propellant materials. One such material is poly(glycidyl 2,2-dinitro-2-fluoroethoxide.) This is a thermally stable, hydroxy-terminated propolymer that can be mixed with conventional propellant ingredients and then cast cured as an explosive or propellant composition.

The conventional method for curing hydroxy-terminated prepolymers of the type contemplated by this invention utilizes a triol such as trimethylol propane or 1,2,6-hexanetriol as the cross-linking agent and a diisocyanate such as toluene diisocyanate or hexamethylene diisocyanate as the curing agent. However, the use of the conventional method referred to above, as a means for curing the poly(glycidyl 2,2-dinitro-2-2fluoroethoxide) prepolymer has proven to be unsuccessful. On the other hand, it has been found that the use of tris ($\beta$-isocyanoethyl) nitromethane provides a novel means for effecting the cure of hydroxy-terminated prepolymers. For example, poly(glycidyl 2,2 dinitro-2-fluroethoxide) has been developed as an important constituent of high density impulse solid propellants. However, its utilization has been severely limited because of the difficulties encountered in attempts at effecting its cure. Prior art methods, such as that referred to above, have either been unsuccessful or highly inefficient. The use of tris ($\beta$-isocyanoethyl) nitromethane as a curing agent, however, overcomes these disadvantages.

Accordingly, the primary object of this invention is to provide a novel curing agent for curing hydroxy-terminated prepolymers.

Still another object of this invention is to provide a simple and efficient method for effecting the cure of poly (glycidyl 2,2-dinitro-2-fluoroethoxide.)

The above and still other objects and advantages of the present invention will become more readily apparent upon consideration of the following detailed description thereof.

DESCRIPTION OF THE PREFERRED EMBODIMENT

Pursuant to the above objects, a novel curing agent for the energetic and thermally stable prepolymer, poly (glycidyl 2,2-dinitro-2-fluoroethoxide) (P-GDNFE), has been developed. P-GDNFE is a hydroxy-terminated prepolymer that has been found to be especially useful as a constituent of high density impulse solid propellants. It can be mixed with oxidizers such as HMX, RDX, ammonium perchlorate and fuels such as aluminum and cast cured into thermally stable, dense, energetic explosive or propellant systems. However, the utilization of P-GDNFE has been limited because of the difficulties encountered in effecting its cure.

The conventional method of curing hydroxy-terminated prepolymers is to utilize a triol such as trimethylolpropane (TMP) or 1,2,6-hexanetriol (HT) as the crosslinking agent and a diisocyanate such as toluene diisocyanate (TDI) or hexamethylene diisocyanate (HDMI) as the curing agent. However, attempts to cure P-GDNFE in this manner with TMP and TDI were unsuccessful due to the insolubility of the crosslinking agents in the prepolymer. To overcome this difficulty it was further suggested that the triol/diisocyanate curing system be replaced with a triisocyanate, which functions both as a chain extender and a crosslinking agent. Good cures were achieved using PAPI-triisocyanate as the particular triisocyanate curing agent. PAPI-triisocyanate is a solid aromatic compound with an equivalent weight of 135. However, although PAPI-triisocyanate was found to be somewhat effective as a curing agent for P-GDNFE; its use involved two distinct disadvantages. First, its high equivalent weight (135) required a relatively large amount of material which is non-energetic and low in density. Second, it is a solid which limits the achievement of the very high solids loading of oxidizer and fuel in energetic explosive and propellant compositions. These disadvantages have been overcome by the replacement of PAPI-triisocyanate with tris (B-isocyanoethyl) nitromethane (TIEN) as the curing agent. The properties of TIEN are summarized in Table I.

TABLE I

| PROPERTIES OF TIEN $O_2NC\,[CH_2CH_2NCO]\,3$ | |
|---|---|
| Equivalent Weight: | 89 |
| Boiling Point: | 145° C/10$\mu$ |
| Density: | 1.303 g/ml |

From Table I it can be seen that TIEN is a high boiling, dense liquid with a low equivalent weight. Furthermore, TIEN contains an energetic nitro group which will contribute to the energy of the overall system. The utilization of TIEN for the development of high density impulse solid propellants is shown by referring to the systems outlined in Table II which illustrate conventional propellant compositions utilizing the P-GDNFE prepolymers and TIEN curing agent of this invention.

TABLE II

| Composition | Isp | IsD |
|---|---|---|
| A. AP/Al/FEFO/P-GDNFE/TIEN | 250–258 | 480–515 |
| B. HMX/Al/FEFO/P-GDNFE/TIEN | 267–273 | 512–527 |
| C. AP/HMX/Al/FEFO/P-GDNFE/TIEN | 264–271 | 503–528 |

The high energy potential of these systems is readily apparent when it is recognized that the IsD of the state-of-the-art solid propellant (70 AP/16 Al/14 CTPB) is only 463.

The excellent processability of a TIEN propellant is evident by the cure time and viscosity data summarized in Table III.

TABLE III

| CURE TIME AND VISCOSITY DATA | | | | |
|---|---|---|---|---|
| Composition (parts by weight) | (kilo-poise) | gFeAA/ 100g Propellant | T | t |
| 59 AP/9 16 Al/15 FEFO/9.26 P-GDNFE/0.74 TIEN | 1.5 | 0.0035 | 129° F | 2.5 hrs. |

Since TIEN was shown to be a favorable replacement for PAPA-triisocyanate, it was therefore of interest to compare the thermal stability of samples with this triisocyanate with those with PAPI-triisocyanate. Consequently, Taliani tests at 40° C and 60° C, DTA and VTS were conducted for samples with TIEN and PAPI. Table IV shows that the samples with TIEN have improved thermal stability.

TABLE IV

| Composition (parts by weight) | | THERMAL STABILITY TESTS | | | | |
| --- | --- | --- | --- | --- | --- | --- |
| | | On Set Exotherm | Peak Exotherm | VTS(150° C) ml/g/hour | Taliani (ml/g) | |
| 60 | FEFO/40 P-GDNFE-PAPI | 200 C | 248 C | 1.33 | 40° C | 60° C |
| 60 | FEFO/40 P-GDNFE-TIEN | 200 C | 254 C | 0.36 | — | — |
| 59 | AP/16 Al/15 FEFO/ 10 P-GDNFE-PAPI | — | — | — | ND*0.016 (48)Hrs | |
| 59 | AP/16 Al/15 FEFO/ 10 P-GDNFE-TIEN | — | — | — | ND 0.04 (48) Hrs | |

ND* = Not Detectable

While the invention has been described with particularity in reference to a specific embodiment thereof, it is to be understood that the disclosure of the present invention is for the purpose of illustration only, and it is not intended to limit the invention in any way, the scope of which is defined by the appended claims.

What is claimed is:

1. A method for curing a poly(glycidyl 2,2-dinitro-2-fluoroethoxide) prepolymer which comprises the step of adding tris ($\beta$-isocyanoethyl) nitromethane to said prepolymer in an amount sufficient to effect the cure thereof.

* * * * *